(12) United States Patent
Stearns et al.

(10) Patent No.: US 8,907,910 B2
(45) Date of Patent: Dec. 9, 2014

(54) CONTEXT BASED GESTURE-CONTROLLED INSTRUMENT INTERFACE

(75) Inventors: Philip Stearns, Colorado Springs, CO (US); Kristopher A Larsen, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 162 days.

(21) Appl. No.: 13/491,071

(22) Filed: Jun. 7, 2012

(65) Prior Publication Data

US 2013/0328787 A1 Dec. 12, 2013

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | | | |
|---|---|---|---|---|
| 4,821,030 | A * | 4/1989 | Batson et al. | 345/173 |
| 7,454,717 | B2 | 11/2008 | Hinkley | |
| 2006/0026536 | A1 * | 2/2006 | Hotelling et al. | 715/863 |
| 2006/0267966 | A1 | 11/2006 | Grossman | |
| 2009/0153518 | A1 * | 6/2009 | Paczkowski | 345/173 |
| 2010/0185949 | A1 | 7/2010 | Jaeger | |
| 2011/0074698 | A1 * | 3/2011 | Rapp et al. | 345/173 |
| 2012/0176401 | A1 * | 7/2012 | Hayward et al. | 345/619 |

FOREIGN PATENT DOCUMENTS

WO WO2012057783 A1 * 3/2012

OTHER PUBLICATIONS

Ying-Wen Baj, Hsing-Eng Lin and Wei-Chun Jau, Design and Implementation of an Integrated Man-Machine Interface by Touch Panel for an Embedded Electronic Measurement System, VECIMS 2008, IEEE Internatonal Conference on Virtual Environments, Human-Computer Interfaces, and Measurement Systems, Jul. 2008, Turkey.

* cited by examiner

*Primary Examiner* — Nicholas Lee (57) ABSTRACT

An instrument and method for operating the same is disclosed. The instrument includes an input port for receiving a signal, a processor for measuring a first parameter related to the signal, and a touch-enabled display. The touch-enabled display receives commands directed to the processor and displays the first parameter. The commands including commands that determine how the first parameter is displayed and commands that determine the manner in which the instrument operates. The commands are grouped into a plurality of contexts. Each command in a context is specified by a control gesture on the touch-enabled display. A first control gesture is used for a first command in a first context, the first control gesture is also utilized for a second command in a second context, the first context being different from the second context.

18 Claims, 9 Drawing Sheets

CONTEXT BASED GESTURE-CONTROLLED INSTRUMENT INTERFACE

BACKGROUND

Many devices include a control panel having a plurality of controls that set the manner in which the device operates. Traditionally, the controls were implemented using switches and potentiometers to provide inputs to the controller that supervises the device functions. These physical input devices were typically mounted on a panel and connected by wires to the controller. Such control panels were customized devices that were only used on one or, at most, a few devices. In essence, each device required a custom control panel. The need for such custom panels increased the cost of the device and the time needed to develop and market a new device.

With the advent of touch screen displays, the problem of providing a control panel has been greatly reduced, since a single touch screen can be programmed to provide a custom control panel for the associated device. In addition, the control functions of many devices are implemented by computers, and hence, the control panel and computer can be provided by programming the computer to provide a display that emulates the "controls" of the traditional control panel and detects the user's interaction with the touch screen to provide the desired changes in the device functions.

For example, a dial that sets the volume of a sound system can be implemented by displaying a picture of a dial on the touch screen. The user touches the dial with a finger and moves the finger to simulate moving the dial. The computer then alters the corresponding control parameter by an amount determined by the degree of movement input by the user. In addition, the computer changes the position of the dial in the display to reflect the new value of the control parameter. Since the display and input regions of the screen are determined by the software, the same touch screen and control computer can be used to control a large range of instruments or other devices.

While such emulated control panels are a significant improvement over conventional panels constructed from dials and the like, there are still significant limitations, particularly when implementing controls that require fine adjustments or panels that require a large number of distinct controls. The resolution of a touch screen is limited by the size of the user's finger and the physical resolution of the screen touch sensor.

To provide fine resolution, the dial must move a distance that is large compared to the smallest distance that the computer can detect with respect to movement of the finger on the screen. Furthermore, the contact area on the screen depends on the pressure with which the user presses the user's finger on the screen. Hence, to simulate a dial that can be positioned with a high degree of accuracy, the size of the emulated dial must be large compared to the size of the user's finger. Accordingly, large screens are preferred for such sensitive applications. Unfortunately, there are limitations to the size of the screens that can be used. The cost of the screens increases rapidly with size. In addition, the device being controlled can constrain the size of the screen. Hence, for many applications, there is a limit to the number of high resolution controls that can be implemented at any one time on the touch screen.

To provide a large number of functions, the touch screen is typically used in a "mouse" mode in which items are selected from lists that are implemented as pull-down menus. For systems having many functions, the menus are typically organized as a hierarchy of nested menus. Such schemes require the user to learn the sequence of menus to arrive at any desired control parameter that is to be adjusted.

SUMMARY

The present invention includes an instrument and method for operating the same. The instrument includes an input port for receiving a signal, a processor for measuring a first parameter related to the signal, and a touch-enabled display. The touch-enabled display receives commands directed to the processor and displays the first parameter. The commands including commands that determine how the first parameter is displayed and commands that determine the manner in which the instrument operates. The commands are grouped into a plurality of contexts. Each command in a context is specified by a control gesture on the touch-enabled display. A first control gesture is used for a first command in a first context, the first control gesture is also utilized for a second command in a second context, the first context being different from the second context.

In one aspect of the invention, only one of the contexts is active at any given time and wherein that context is chosen by the processor when a user touches a location on the touch-enabled display corresponding to that context. In another aspect of the invention, the instrument utilizes a second parameter that determines how the instrument operates, the second parameter includes a numeric value that is specified by a first control gesture in one of the contexts. The first control gesture can include one finger or two finger gestures. A one-finger gesture includes dragging a finger along a path starting from a first location on the touch-enabled display and characterized by a direction and distance traveled by the finger. The numeric value can depend on the first location, the direction, or the distance. In addition, the first control gesture can specify an object on the touch-enabled display and cause the object to move a new location on the touch-enabled display, the numeric value depending on the new location.

A two-finger gesture includes dragging a first finger and a second finger along a path characterized by the direction and distance traveled of the first finger relative to the second finger. In one aspect of the invention, the numeric value increases in response to the first finger moving away from the second finger, and decreases in response to the first finger moving toward the second finger. In another aspect of the invention, the first finger and the second finger move in substantially the same direction, and the numeric value depends an average distance between the first and second finger.

In another aspect of the invention, the instrument utilizes a plurality of parameters that determine how the instrument operates, and one of the contexts includes a setup context having setup gestures for setting the parameters. The setup gestures includes a default gesture that sets the parameters to default values stored in the instrument when the processor detects the default gesture while the context is the setup context.

In yet another aspect of the invention, the touch-enabled display displays a plurality of objects and one of the contexts is a display context which includes a first display gesture for causing a selected one of the objects to be expanded or reduced in size on the display while leaving another of the objects unchanged. A second display gesture causes an object on the touch-enabled display to be selected and removed from the touch-enabled display.

In a still further aspect of the invention, the instrument includes an oscilloscope, one of the gestures includes gestures for determining how the oscilloscope is triggered. In one aspect, the gestures determine a threshold for an input signal, the oscilloscope being triggered when the input signal crosses the threshold in a direction determined by the gesture. In another aspect, the gesture determines a rate of change for an input signal, the oscilloscope being triggered when the input signal changes at a rate that has a predetermined relationship to the rate of change in a direction determined by the gesture.

DESCRIPTION OF EMBODIMENTS OF THE INVENTION

The manner in which the present invention provides its advantages can be more easily understood in the context of an oscilloscope in which the display screen is a touch-enabled screen. In general, an oscilloscope displays the measured values of one or more quantities related to an input signal or signals as a function of time. The initial time at which the display starts is determined by a trigger event that typically is related to one or the input signals such as when the signal crosses a particular threshold. Alternatively, the trigger event could be determined by the user for slowly-changing signals. The manner in which the oscilloscope is triggered and displays the signals is determined by a number of commands that typically were entered through dials on a control panel. These commands can also specify which of a plurality of input signals is displayed at any given time.

The oscilloscope commands can be viewed as being divided into a plurality of contexts. For example, commands that determine how the oscilloscope triggers on an input signal form a first context, and commands that determine how the waveforms are displayed form a second context. In each context, one or more gestures are defined.

A gesture is defined to be an operation in which a user places a finger on the screen and then moves the finger while the finger remains in contact with the screen. A gesture may be a "one finger" gesture in which only one finger is in contact with the screen, or a "two finger" gesture in which two fingers are in contact with the screen. The direction of motion of the finger in a one finger gesture specifies information about the identity of the gesture and also may impart information as to the magnitude of a quantity defined by the gesture. In two finger gestures, both the direction of motion of the fingers and/or the relative directions in which the fingers move specifies information.

Figure 1:
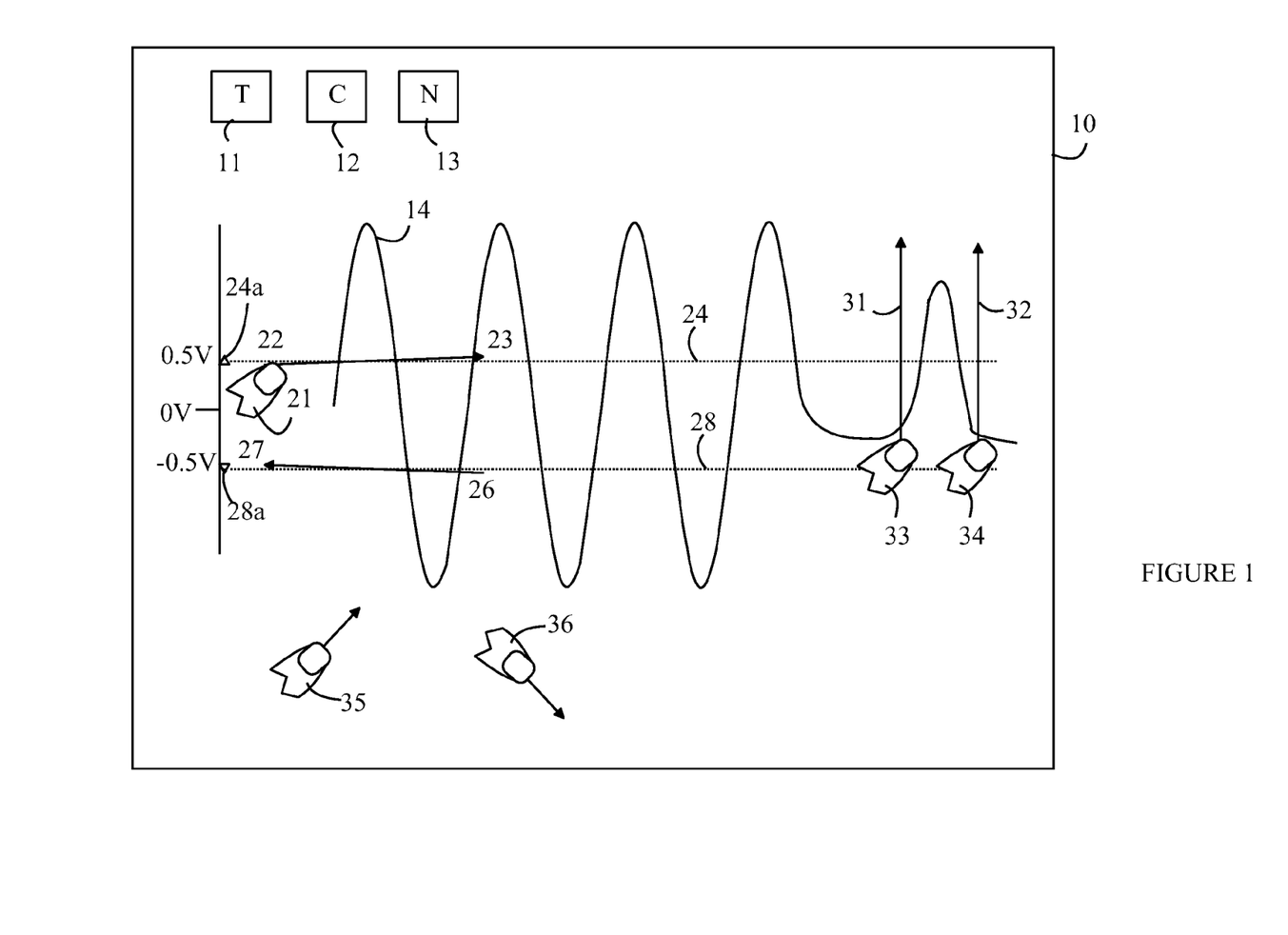
FIG. 1 illustrates a display according to one embodiment of the present invention.

Consider an oscilloscope that is displaying a waveform 14 that is input to the oscilloscope. Refer now to FIG. 1, which illustrates a display according to one embodiment of the present invention. Display 10 includes a number of elements that specify the current context of the gestures performed on the surface of display 10. Three such elements are shown at 11-13. The user first touches the desired element to define the context for interpreting the gestures that follow. In this embodiment, element 11 specifies a context in which trigger levels are set. Element 12 changes the context from gestures to cursors control. Element 13 is used to specify a display context that is used to control how and where the waveform is displayed on display 10.

Consider the case in which the user first touches element 11 and then drags the user's finger 21 from point 22 to point 23. In this embodiment and context, that gesture corresponds to setting the trigger level of the oscilloscope to trigger on a rising signal edge at a threshold voltage that is determined by the average vertical position of the gesture, which is 0.5V in the current example as shown at 24. Similarly, if the user drags his finger from point 26 to point 27, the oscilloscope sets the trigger mode to trigger on a falling signal edge when the signal crosses −0.5V as shown at 28.

In one aspect of the invention, the trigger level lines shown at 24 and 28 are replaced by markers 24a and 28a on the vertical axis after a predetermined time has elapsed to simplify the display. In one embodiment, the markers have different shapes to indicate whether the trigger is for a rising or falling wave that crosses the threshold indicated by the marker position. However, the user can alter the positions of the trigger levels and/or re-display the trigger lines by touching the corresponding marker on the vertical axis and either moving that marker or moving the trigger level line that re-appears when the marker is touched.

An example of a two-finger trigger gesture is shown at 31 and 32. In this gesture, the user places the user's fingers 33 and 34 on the screen and drags the fingers upward in a substantially parallel path. This gesture signals the computer to set the trigger mode to trigger on a pulse having a duration that is determined by the average difference between paths 31 and 32. If the gesture is made in the upward direction as shown in the figure, the trigger mode is set to trigger on a pulse having a duration less than the indicated duration. If the gesture is made in the downward direction, the trigger mode is set to trigger on a pulse having a duration greater than the indicated duration. It should be noted that this gesture can be performed in addition to the trigger level gestures discussed above such that the oscilloscope triggers when a pulse satisfying the duration limitation crosses the specified threshold in the specified direction. It should also be noted that the location at which the gesture is performed is irrelevant to the outcome; only the direction of the gesture and the distance between the fingers determines the result.

In the trigger mode discussed above, the oscilloscope is triggered when the signal crosses the specified threshold in the specified direction independent of the slope of the signal when it crosses that threshold. In another aspect of the invention, the user specifies a trigger level that is determined by the rate of rise or fall of a signal. This gesture is signaled by dragging the finger in an upward or downward direction at an angle as shown at 35 and 36. The direction of the gesture specifies whether the trigger is to be initiated on the rising or falling edge of the signal, and the angle of the line traced by the finger with respect to the vertical determines the minimum rate of change that must be encountered to trigger the oscilloscope. The upward direction specifies that the oscilloscope is to be triggered on the rising edge when the slope is greater than the slope specified by the angle of the line with respect to the vertical direction on the screen. Similarly, a downward direction specifies that the oscilloscope is to be triggered on the falling edge of the signal when the slope is less than the slope specified by the angle of the line with respect to the vertical direction.

Figure 2A:
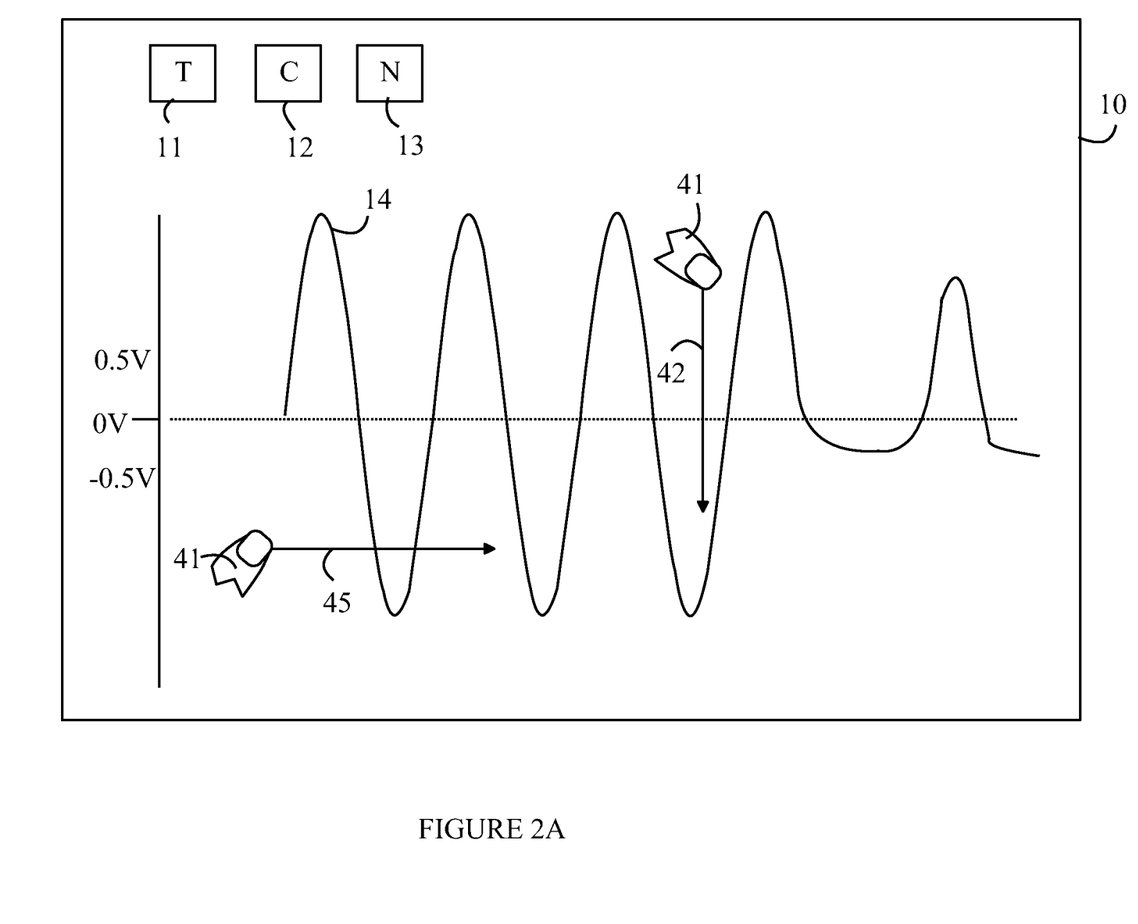
FIGS. 2A-2B illustrate the cursor gesture for defining a cursor consisting of a vertical or horizontal line at a predetermined location.
Figure 2B:
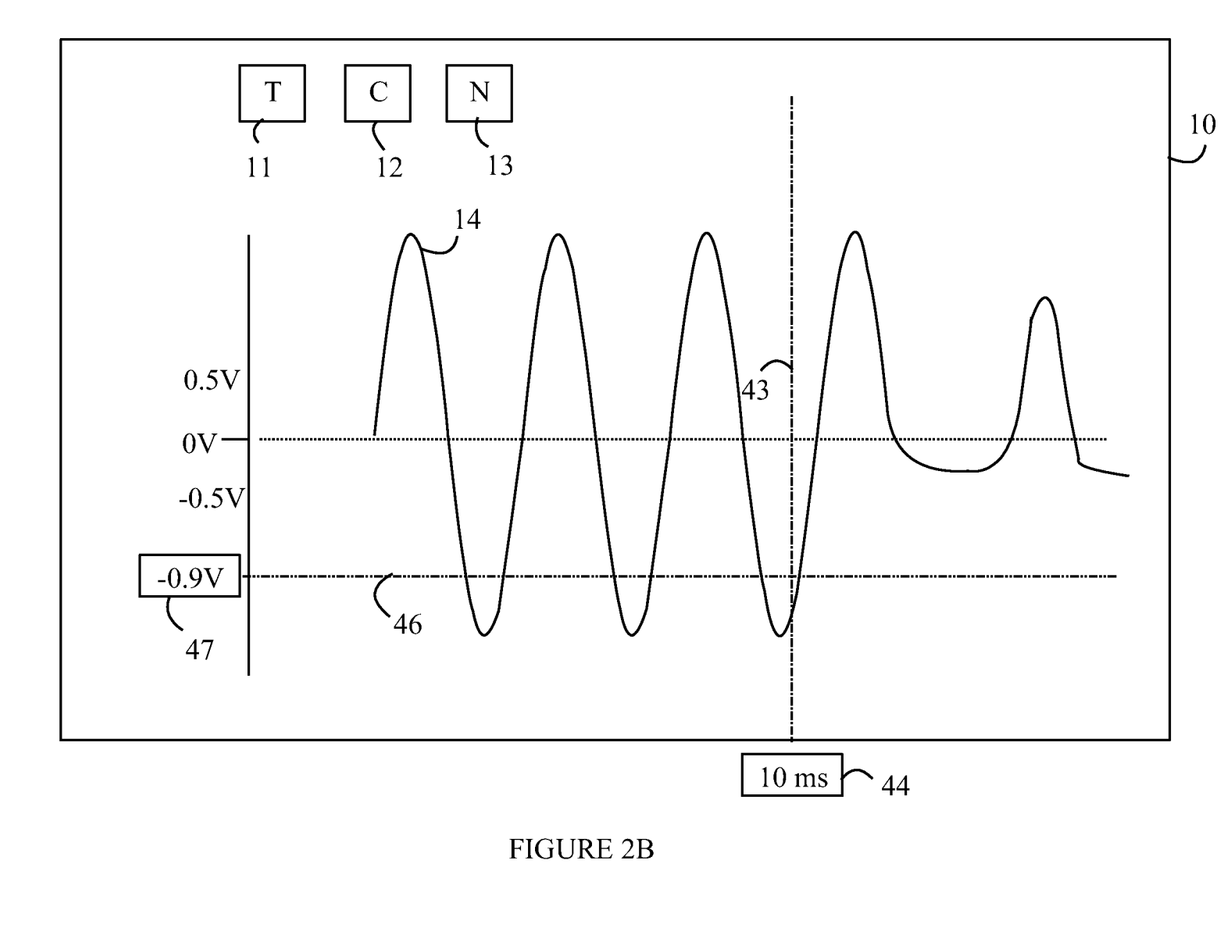

A second gesture context is used for defining cursors on the display. For the purpose of this discussion, a cursor is defined to be an object that is located at a fixed position and remains on the display until it is removed. In one aspect of the invention, the cursor takes the form of a vertical or horizontal line or an object such as an arrow or cross-hair. The cursor can optionally include an indicator that presents the position of the cursor in a manner that can be read in the units of the horizontal or vertical axes. The location at which the cursor-defining gesture is performed determines the initial location of the cursor. The cursor mode is initiated by touching element 12 on the display prior to performing the cursor-defining gesture(s). FIGS. 2A-2B illustrate the cursor gesture for defining a cursor consisting of a vertical or horizontal line at a predetermined location. FIG. 2A illustrates the gestures which consists of dragging finger 41 in a vertical downward direction as shown by arrow 42 to indicate a vertical cursor line or horizontally as shown by arrow 45 to indicate a horizontal cursor line. FIG. 2B shows the resultant cursors which consist of a dashed line 43 with an indicator 44 showing the location of the cursor on the horizontal axis for the vertical cursor and a horizontal dashed line 46 with an indicator 47 showing the location of the horizontal cursor on the vertical axis.

Figure 2C:
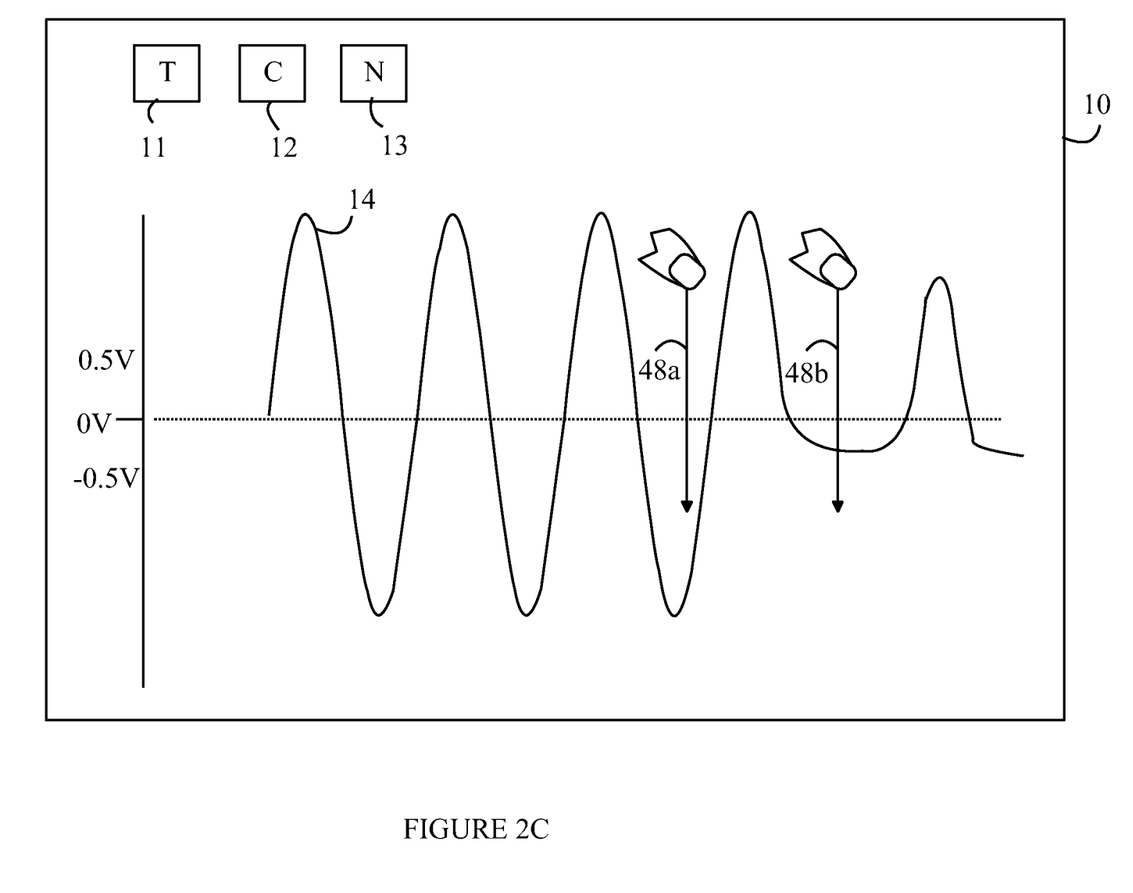
FIGS. 2C-2D illustrate a two finger cursor defining gesture that results in two vertical linked cursors being introduced into the display.
Figure 2D:
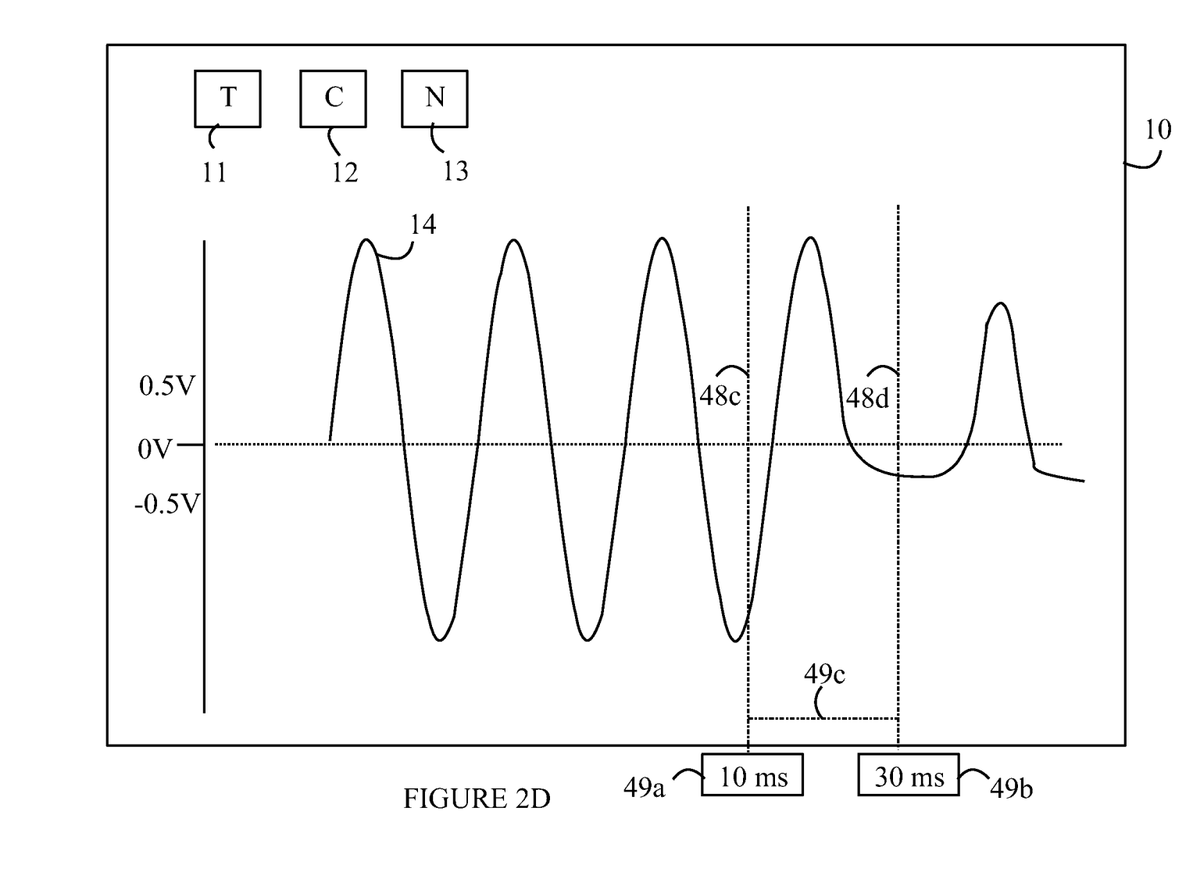

In one aspect of the invention, two finger cursor gestures are used to define a pair of cursors that are bound together and separated by a predetermined separation in the vertical or horizontal direction. As will be explained in more detail below, when one of these cursors is moved, its companion cursor is also moved such that the separation between the cursors remains constant. FIGS. 2C-2D illustrate a two finger cursor defining gesture that results in two vertical linked cursors being introduced into the display. Referring to FIG. 2C, the gesture is signaled by dragging a first finger and a second finger in a downward direction simultaneously as shown at 48a and 48b. The locations of the fingers define the locations of the cursors. FIG. 2D illustrates the resultant linked vertical cursors created by the gesture shown in FIG. 2C. The two vertical lines include indicators 49a and 49b on the horizontal axis that provide the locations of the vertical cursors 48c and 48d. The line shown at 49c indicates that the cursors are linked together. A pair of horizontally linked cursors can be defined in an analogous manner.

Figure 3:
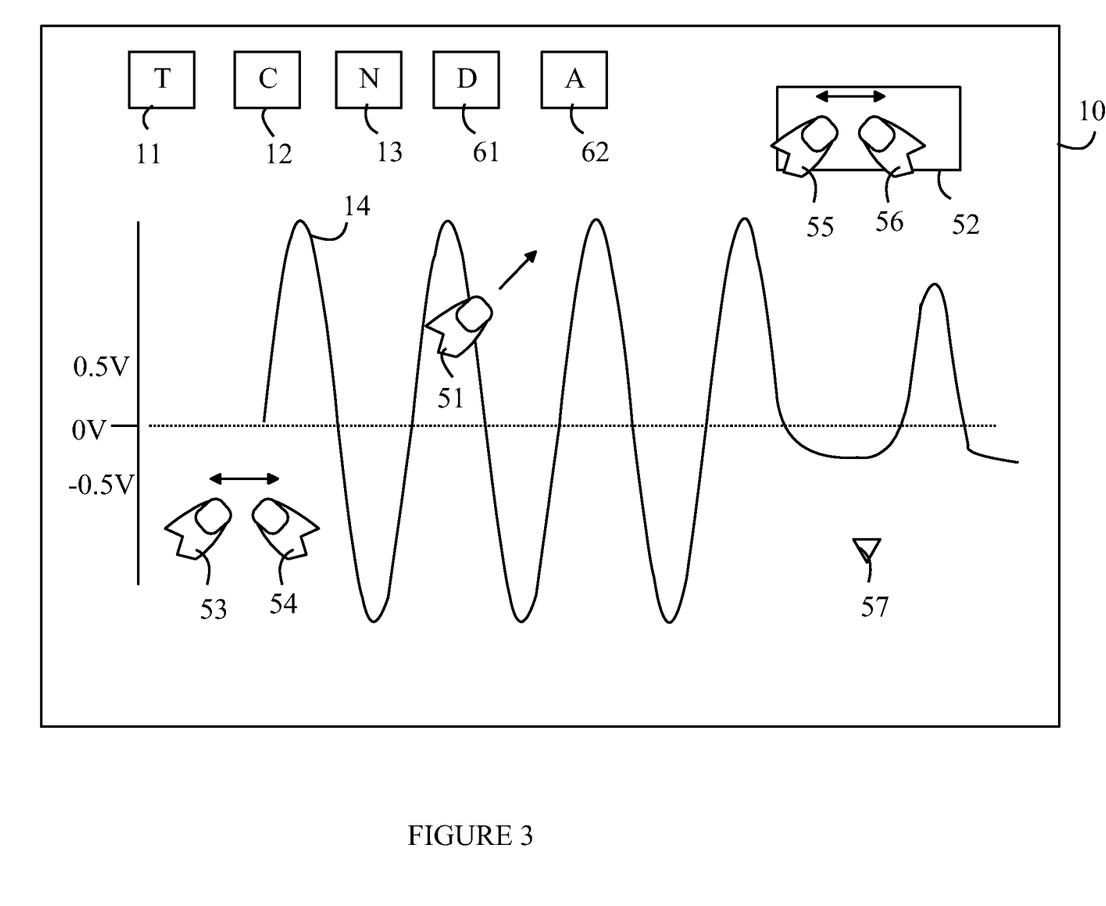
FIG. 3 illustrates a number of navigation gestures.

Refer now to FIG. 3, which illustrates a number of navigation gestures. The navigation gestures are initiated by touching element 13 on display 10. The navigation gestures alter the manner in which objects in the display such as waveform 14 are displayed on display 10. An offset gesture causes the location of waveform 14 to be moved on the screen. For example, the user touches waveform 14 and then drags the user's finger in the direction that waveform 14 is to move. The final location of waveform 14 is determined by the final location of finger 51 when the finger is lifted from the screen. Similarly, the user can move other objects on the screen to new locations by touching and dragging the object in the same manner. For example, the location of display box 52 could be moved by touching the box and dragging the box to the new location.

Two finger navigation gestures can also be defined. For example, a two-finger gesture in which fingers 53 and 54 are moved together or apart while in contact with the display are used to zoom out or zoom in, respectively. The location of the fingers can be used to indicate the desired location of the center of the zoomed display. In one aspect of the invention, the zoom is only applied to the selected object on the display. Hence, if display box 52 is selected, the gesture indicated by moving fingers 55 and 56 relative to one another only alters the display of display box 52. For example, moving the fingers apart expands display box 52 so that the details in the object can be more easily read. Moving the fingers together collapses the object so that it takes up less space on the display, thereby reducing the portions of the rest of the objects that are blocked by display box 52.

In another aspect of the invention, the two fingers are rotated with respect to one another to indicate that the object is to be rotated in the direction of the finger rotation by an amount that depends on the angle through which the fingers are moved.

The above-described embodiments utilize three contexts for the gestures; however, additional contexts can also be defined. Referring again to FIG. 3, two additional contexts are shown at 61 and 62. Context 61 provides gestures that result in more or less information being displayed with respect to a selected object on display 10. This will be referred to as the "detail" context. For example, assume display box 52 is selected and that additional information related to display box 52 is available, but not displayed. Moving fingers 55 and 56 apart in this context causes the additional information to be displayed. This will be referred to as an expand gesture in this context. Similarly, moving the fingers together causes the additional information to be hidden. This will be referred to as collapse gesture in this context. In one aspect of the invention, the additional information is organized in a sequence of displays in a predetermined order. Each time the expand gesture is executed, the next display in the sequence is generated. Similarly, each time the collapse gesture is executed, the previous display in the sequence is provided and the current display is removed. This type of expand and collapse gesturing can be applied to any object on the display. If more details are not available, the gesture is ignored. If the collapse gesture is applied to an object continually, the object will finally be reduced to its minimum form, which may be a single icon on the display such as the graphical symbol shown at 57.

Figure 4:
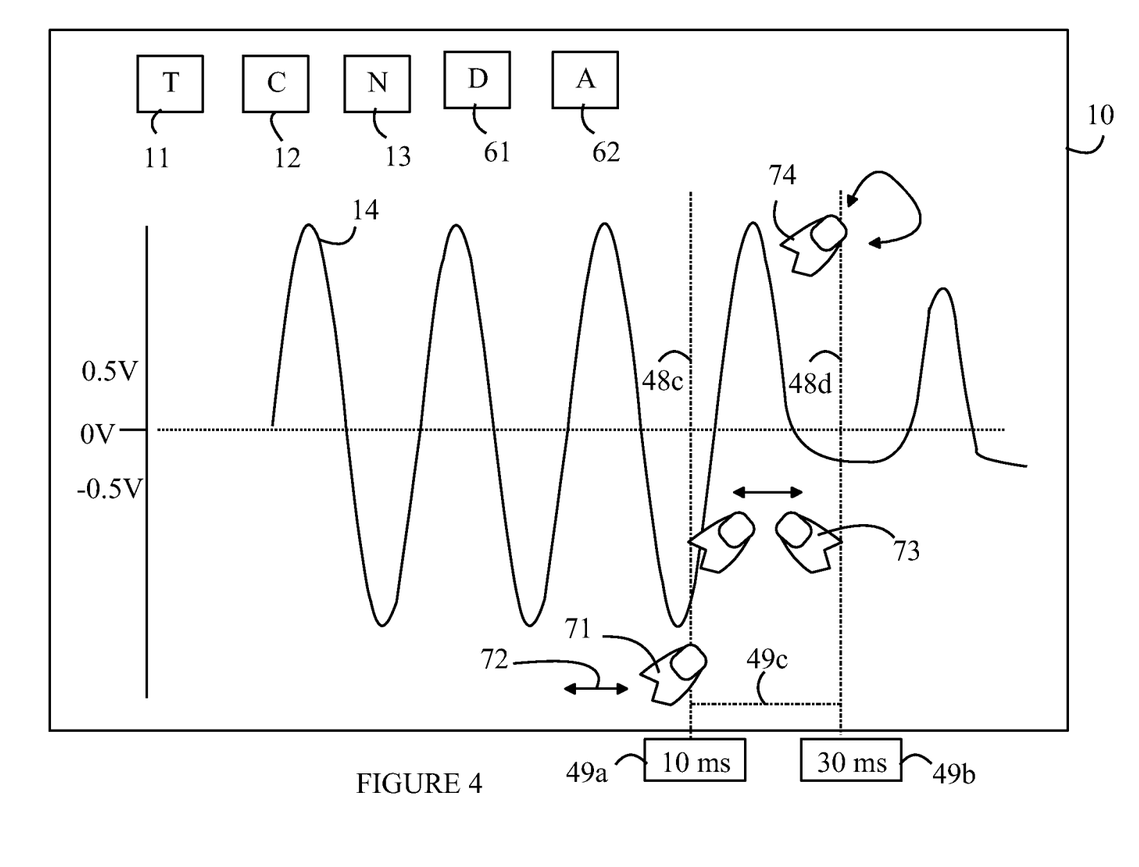
FIG. 4 illustrates the alteration of a linked cursor object.

Context 62 provides gestures that alter the properties of an existing object on the display. In this context, the user selects an object by touching the object. The user then uses one or more gestures to alter the object or to remove the object. In this case, the gesture may depend on the object selected as well as the context. Refer now to FIG. 4, which illustrates the alteration of a linked cursor object. The cursor object is selected by touching the object as shown at 71 after selecting the A context by touching context 62. The cursor object can be altered by changing its position and/or the separation between the individual vertical cursors. In addition, the cursor object can be altered by removing it entirely from the display. The horizontal position of the cursor object is changed by dragging the cursor object with one finger as indicated by the arrows at 72. The separation of the two linked cursor lines can be altered with a two-finger gesture as shown at 73 in which the separation is decreased by a pinching motion and increased by moving the fingers apart. Finally, the cursor object can be deleted by touching the object and dragging it in a circular motion as shown at 74 to simulate "rubbing it out". It should be noted that the movement gesture and deleting gesture are applicable to a number of different objects, whereas the expansion and contraction gestures are only applicable for objects that have a dimension that can be changed, and hence, depend on the identity of the selected object.

Instruments may be configured in a manner in which it is inconvenient to provide the input of key values by a keyboard or the like. For example, a rack mounted oscilloscope may not have a keyboard that can always be accessed when connected to a particular experimental setup. Gestures can also be used to input specific values. The location of a trigger level through the gestures discussed above is an example of such a gesture. Similarly, a specific value that can be represented by a point on the horizontal or vertical axes can be input by a one finger gesture that involves touching the axis at a corresponding point. The separation of the fingers in a two finger gesture can likewise be used to input a differential value that is not related to the point on the axes at which the gesture is made.

Figure 5:
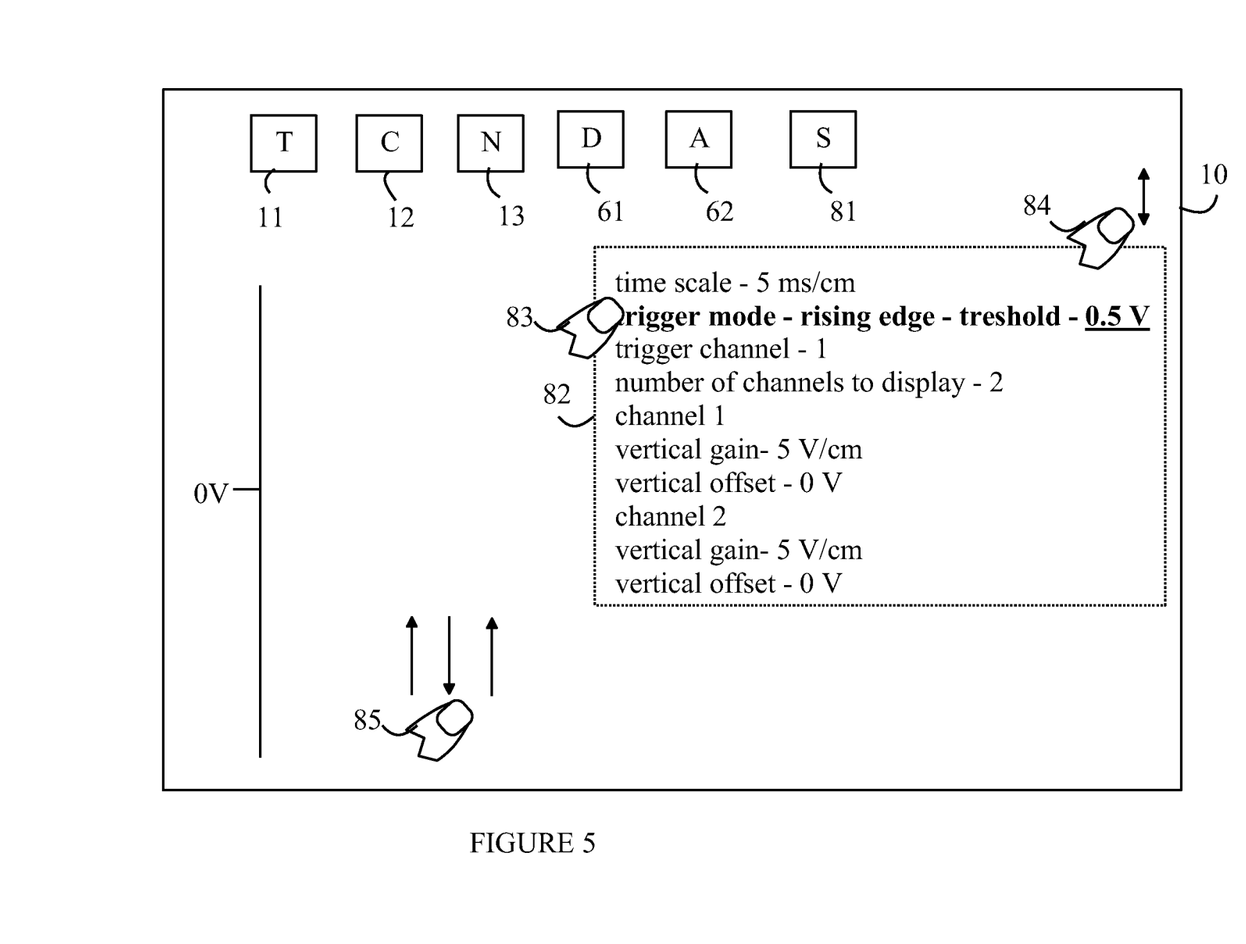
FIG. 5 illustrates a setup context according to one embodiment of the present invention.

In general, an instrument has a number of parameters related to the current setup of the instrument. These parameters may include a default setup that is communicated by a gesture in an instrument setup context. Refer now to FIG. 5 which illustrates a setup context according to one embodiment of the present invention. The setup context is initiated by touching a context icon such as icon 81 shown in FIG. 5. In one aspect of the invention, a list of setup parameters 82 is displayed along with the current values for those parameters. The user can adjust any parameter by touching the parameter and executing a gesture to change the parameter such as moving finger 84 up and down to increase or decrease the value for that parameter.

When the user touches the parameter as shown at 83, the corresponding entry is highlighted to indicate that it is available to change. The user can then select a component of that parameter to alter by touching that component. A component can correspond to one of a plurality of choices or an analog value. In the case of "trigger mode" shown in this embodiment, the mode is chosen from a list of choices while the trigger level is an analog value. When the user touches the type of mode, in this case "rising edge", the processor that controls the display presents a list of choices to the user. The user can then chose one of the alternatives by an appropriate gesture such as touching that choice and dragging the finger horizontally to indicate the selection.

In the case of an analog value, the user touches the value and indicates that the value is to be increased or decreased by dragging the user's finger vertically in either an upward or downward direction to indicate increasing or decreasing, respectively of the value. The value being changed is highlighted, e.g. by being underlined in the current example. The value on the screen changes as the user drags the user's finger. If the value changes too slowly, the user can signal an increase in the rate of change by using a two-finger gesture in which both fingers are dragged in the appropriate direction.

It should be noted that other gestures can be utilized for signaling increasing and decreasing values. For example, the two finger gestures used to zoom in and zoom out discussed above could also be used to signal increasing and decreasing, respectively, of a selected value.

The set of values can be set to a predetermined setup such as a default set using another gesture such as the gesture shown at 85 that consists of dragging a finger in an upward direction followed by dragging the finger in a downward direction followed by again dragging the finger in an upward direction.

In general, space on an instrument display is at a premium. In one aspect of the invention, the displays that are related to specific contexts are hidden or "collapsed" when another context is chosen. For example, the setup context display discussed above is hidden when another context is chosen. Similarly, the trigger levels shown in FIG. 1 are collapsed to the icons shown at 24a and 28a in FIG. 1 after a predetermined period of time has elapsed.

The above-described embodiments have utilized an oscilloscope as the exemplary instrument to which the teachings of the present invention are applied. However, a display and gesture control system according to the present invention can be advantageously applied to a large range of instruments. For the purpose of this discussion, an instrument is defined to be a device for measuring the present value of a quantity under investigation. Typically, the quantity is an electrical signal that is characterized by an amplitude, power, or current that changes as a function of time or frequency. The electrical signals of interest are typically analog in nature; however, instruments that measure and record digital signals as a function of time could also benefit from a control system according to the present invention. Examples of such instruments are oscilloscopes, spectrum analyzers, Logic Analyzers, Vector Signal Analyzers, Bit Error Rate Testers, and Network Analyzers. Oscilloscopes include Mixed-Signal Oscilloscopes and Sampling Oscilloscopes. Oscilloscopes and spectrum analyzers are fundamentally instruments that are concerned with the parametric properties of analog waveforms, oscilloscopes in the time domain, and spectrum analyzers in the frequency domain. A network diagnostic system works at a much higher level of abstraction. Data is acquired as actual protocol traveling through a system, and these diagnostic tools are looking for errors in the protocol, or more likely at an even higher level by analyzing the macro behavior of the traffic.

Figure 6:
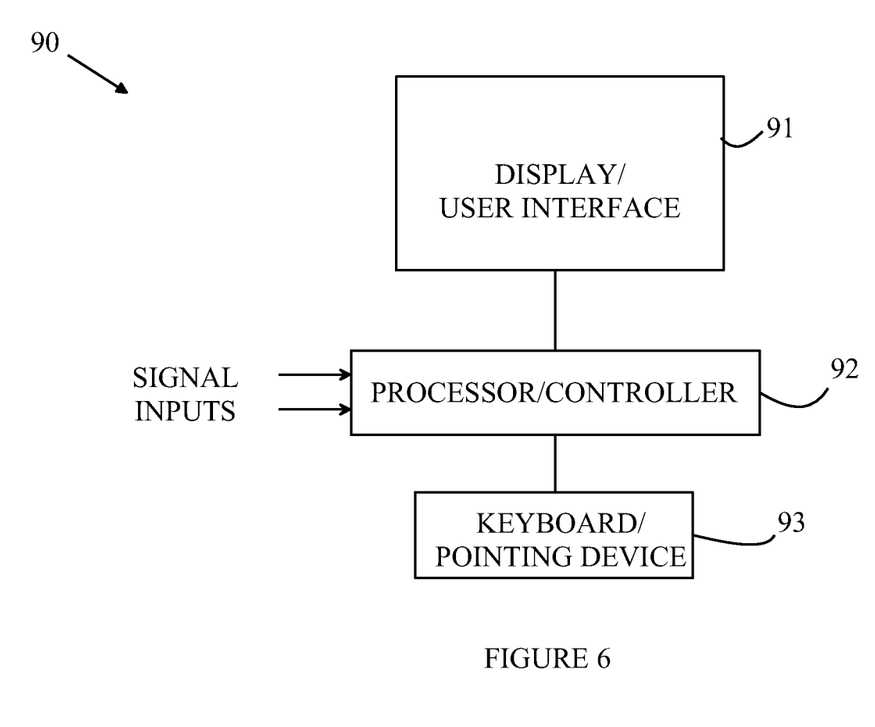
FIG. 6 illustrates a generic instrument in which the present invention can be incorporated.

Refer now to FIG. 6, which illustrates a generic instrument in which the present invention can be incorporated. Instrument 90 includes a touch-enabled display 91 that is controlled by a processor/controller 92 that receives the signals being measured and displays the results of those measurements on touch-enabled display 91. For the purposes of the present discussion, a touch-enabled display is defined to be a display which detects the position(s) at which a user touches the display surface. In one aspect of the invention, the touch-enabled display detects the positions of simultaneous touches so as to implement the various two-finger gestures discussed above. Instrument 90 can optionally include a keyboard 93 and/or pointing device for receiving user inputs in addition to the inputs provided through the touch-enabled display.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An instrument comprising:
   an input port for receiving a signal;
   a processor for measuring a first parameter related to said signal; and
   a touch-enabled display for receiving commands directed to said processor and displaying said first parameter, said commands including commands that determine how said first parameter is displayed and commands that determine one or more operations that are performed by said instrument,
   wherein said commands are grouped into a plurality of contexts, each command in a context being specified by a corresponding one of a plurality of control gestures on said touch-enabled display, a first control gesture being used for a first command in a first context, said first control gesture also being utilized for a second command in a second context, said first context being different from said second context, said processor detecting said first control gesture.

2. The instrument of claim 1 wherein only one of said contexts is active at any given time and wherein that one of said contexts is chosen by said processor when a user touches a location on said touch-enabled display corresponding to that one of said contexts.

3. The instrument of claim 1 wherein said instrument utilizes a second parameter that determines how said instrument operates, said second parameter comprising a numeric value that is specified by a first control gesture in one of said contexts.

4. The instrument of claim 3 wherein said first control gesture comprises a one-finger gesture comprising dragging a finger along a path starting from a first location on said touch-enabled display and characterized by a direction and distance traveled by said finger.

5. The instrument of claim 4 wherein said numeric value depends on said first location.

6. The instrument of claim 4 wherein said numeric value depends on said direction.

7. The instrument of claim 4 wherein said numeric value depends on said distance.

8. The instrument of claim 4 wherein said first control gesture specifies an object on said touch-enabled display and wherein said first control gesture causes said object to move to a new location on said touch-enabled display, said numeric value depending on said new location.

9. The instrument of claim 3 wherein first control gesture comprises a two-finger gesture comprising dragging a first finger and a second finger along a path characterized by a direction and distance traveled of said first finger relative to said second finger.

10. The instrument of claim 9 wherein said numeric value increases in response to said first finger moving away from said second finger.

11. The instrument of claim 9 wherein said numeric value decreases in response to said first finger moving toward said second finger.

12. The instrument of claim 9 wherein said first finger and said second finger move in substantially the same direction and wherein said numeric value depends on an average distance between said first and second fingers.

13. The instrument of claim 1 wherein said instrument utilizes a plurality of parameters that determine how said instrument operates and wherein one of said contexts comprises a setup context having setup gestures for setting said plurality of parameters, said setup gestures comprising a default gesture that sets said plurality of parameters to corresponding default values stored in said instrument when said processor detects said default gesture while said context is said setup context.

14. The instrument of claim 1 wherein said touch-enabled display displays a plurality of objects and wherein one of said contexts is a display context comprising a first display gesture for causing a selected one of said plurality of objects to be expanded or reduced in size on said display while leaving another of said plurality of objects unchanged.

15. The instrument of claim 14 wherein a second display gesture causes an object on said touch-enabled display to be selected and removed from said touch-enabled display.

16. The instrument of claim 1 comprising an oscilloscope, one of said gestures determining how said oscilloscope is triggered.

17. The instrument of claim 16 wherein said one of said gestures determines a threshold for an input signal, said oscilloscope being triggered when said input signal crosses said threshold in a direction determined by said one of said gestures.

18. The instrument of claim 16 wherein said one of said gestures determines a rate of change for an input signal, said oscilloscope being triggered when said input signal changes at a rate that has a predetermined relationship to said rate of change in a direction determined by said one of said gestures.

* * * * *